United States Patent
Shemer et al.

(10) Patent No.: US 11,750,457 B2
(45) Date of Patent: Sep. 5, 2023

(54) AUTOMATED ZONING SET SELECTION TRIGGERED BY SWITCH FABRIC NOTIFICATIONS

(71) Applicant: Dell Products L.P., Round Rock, TX (US)

(72) Inventors: Jehuda Shemer, Kfar Saba (IL); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 17/387,520

(22) Filed: Jul. 28, 2021

(65) Prior Publication Data
US 2023/0035311 A1    Feb. 2, 2023

(51) Int. Cl.
H04L 41/0816    (2022.01)
H04L 67/1097    (2022.01)

(52) U.S. Cl.
CPC ...... *H04L 41/0816* (2013.01); *H04L 67/1097* (2013.01)

(58) Field of Classification Search
CPC .................. H04L 67/1097; H04L 41/0816
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,003,527 B1 | 2/2006 | Lavallee et al. |
| 7,051,101 B1 * | 5/2006 | Dubrovsky ......... H04L 41/0813 709/219 |
| 7,275,103 B1 | 9/2007 | Thrasher et al. |

(Continued)

FOREIGN PATENT DOCUMENTS

| | | | |
|---|---|---|---|
| CN | 104283803 A | * | 1/2015 |
| CN | 105577436 A | * | 5/2016 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Shean Tokuta
(74) *Attorney, Agent, or Firm* — Ryan, Mason & Lewis, LLP

(57) ABSTRACT

An apparatus in one embodiment includes at least one processing device configured to receive at least one notification from a switch of a switch fabric coupled between one or more host devices and a storage system, to select a particular one of a plurality of zoning sets based at least in part on the one or more received notifications, and to send an indication of the selected zoning set to the switch. The indication of the selected zoning set illustratively comprises a command that instructs the switch to alter its zoning configuration in accordance with the selected zoning set. In some embodiments, the processing device comprises a data protection appliance coupled to a storage area network that includes the switch fabric. The switch may comprise a Fibre Channel (FC) switch of an FC switch fabric, and the notification may comprise a fabric performance impact notification (FPIN) generated by the switch.

20 Claims, 5 Drawing Sheets

(56) References Cited

U.S. PATENT DOCUMENTS

| | | |
|---|---|---|
| 7,397,788 B2 | 7/2008 | Mies et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,270,580 B1 * | 2/2016 | Abraham .............. H04L 45/22 |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,712,613 B2 | 7/2017 | Balasubramanian et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,523,513 B2 | 12/2019 | Bennett et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B1 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 11,050,660 B2 | 6/2021 | Rao et al. |
| 11,126,378 B1 * | 9/2021 | Parker ................ G06F 11/1068 |
| 11,308,004 B1 * | 4/2022 | Rao .................... G06F 13/1668 |
| 2001/0054093 A1 | 12/2001 | Iwatani |
| 2002/0023151 A1 | 2/2002 | Iwatani |
| 2002/0103923 A1 | 8/2002 | Cherian et al. |
| 2003/0195956 A1 | 10/2003 | Bramhall et al. |
| 2003/0208581 A1 | 11/2003 | Behren et al. |
| 2004/0010563 A1 | 1/2004 | Forte et al. |
| 2004/0073648 A1 | 4/2004 | Tanino et al. |
| 2004/0081186 A1 | 4/2004 | Warren et al. |
| 2006/0026346 A1 | 2/2006 | Kadoiri et al. |
| 2006/0036736 A1 | 2/2006 | Kitamura et al. |
| 2006/0106819 A1 | 5/2006 | Dhanadevan et al. |
| 2006/0190611 A1 * | 8/2006 | Miyazaki .............. G06F 3/0637 709/229 |
| 2006/0277383 A1 | 12/2006 | Hayden et al. |
| 2007/0174849 A1 | 7/2007 | Cheung et al. |
| 2007/0239989 A1 | 10/2007 | Barnett et al. |
| 2007/0242617 A1 | 10/2007 | Ichimura |
| 2007/0291785 A1 * | 12/2007 | Sharma ................ H04L 41/0886 370/464 |
| 2007/0294563 A1 | 12/2007 | Bose |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2009/0282135 A1 | 11/2009 | Ravindran et al. |
| 2010/0131950 A1 | 5/2010 | Yamada et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0163374 A1 | 6/2012 | Shah et al. |
| 2012/0246345 A1 | 9/2012 | Contreras et al. |
| 2013/0019001 A1 | 1/2013 | Winokur |
| 2013/0046892 A1 | 2/2013 | Otani |
| 2013/0067066 A1 * | 3/2013 | Dickens .............. H04L 12/6418 709/224 |
| 2013/0117766 A1 | 5/2013 | Bax et al. |
| 2013/0179617 A1 * | 7/2013 | Myrah .................. G06F 3/0637 710/300 |
| 2013/0339551 A1 | 12/2013 | Flanagan et al. |
| 2014/0105068 A1 | 4/2014 | Xu |
| 2014/0156878 A1 * | 6/2014 | Hameed .................... G06F 3/00 710/19 |
| 2014/0201342 A1 * | 7/2014 | Gimpl .................. G06F 15/177 709/221 |
| 2015/0089015 A1 | 3/2015 | Rosset et al. |
| 2015/0222705 A1 | 8/2015 | Stephens |
| 2015/0242134 A1 | 8/2015 | Takada et al. |
| 2016/0050277 A1 | 2/2016 | Kirk et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2016/0380804 A1 | 12/2016 | Amano |
| 2017/0134220 A1 | 5/2017 | Chen et al. |
| 2017/0235507 A1 | 8/2017 | Sinha et al. |
| 2018/0026863 A1 | 1/2018 | Hughes et al. |
| 2018/0189635 A1 | 7/2018 | Olarig et al. |
| 2018/0219755 A1 * | 8/2018 | Agarwal ............ H04L 41/0659 |
| 2018/0253256 A1 | 9/2018 | Bharadwaj |
| 2018/0317101 A1 | 11/2018 | Koue |
| 2019/0020603 A1 | 1/2019 | Subramani et al. |
| 2019/0095299 A1 | 3/2019 | Liu et al. |
| 2019/0108888 A1 | 4/2019 | Sarkar et al. |
| 2019/0312810 A1 * | 10/2019 | Strom .................... H04L 45/64 |
| 2019/0319846 A1 | 10/2019 | Dhanadevan et al. |
| 2019/0334774 A1 * | 10/2019 | Bennett ................ H04L 49/357 |
| 2019/0334987 A1 | 10/2019 | Mallick et al. |
| 2020/0021653 A1 | 1/2020 | Rao et al. |
| 2020/0050570 A1 * | 2/2020 | Agarwal ............ H04L 12/2818 |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0154326 A1 * | 5/2020 | Deenoo .................. H04W 36/08 |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |
| 2022/0091761 A1 * | 3/2022 | Patel .................... G06F 3/0605 |
| 2022/0171538 A1 * | 6/2022 | Charles .................. G06F 3/061 |
| 2022/0179580 A1 * | 6/2022 | Anchi .................. G06F 3/0635 |
| 2022/0229582 A1 * | 7/2022 | Rao ...................... G06F 3/0635 |
| 2023/0035311 A1 * | 2/2023 | Shemer .............. H04L 41/0816 |
| 2023/0091184 A1 * | 3/2023 | Venkatanarayanan ........................ G06F 16/2455 |

FOREIGN PATENT DOCUMENTS

| | | |
|---|---|---|
| CN | 103677927 B | 2/2017 |
| CN | 111245645 A * | 6/2020 |
| EP | 1117028 A2 | 7/2001 |
| EP | 2667569 A1 | 11/2013 |
| EP | 3160084 A1 * | 4/2017 |

(56) References Cited

FOREIGN PATENT DOCUMENTS

| JP | 2006228078 A | * | 8/2006 |
| --- | --- | --- | --- |
| WO | WO-2016069021 A1 | * | 5/2016 |
| WO | PCT/US2019/052549 | | 12/2019 |
| WO | PCT/US2019/053204 | | 12/2019 |
| WO | PCT/US2019/053473 | | 12/2019 |
| WO | PCT/US2019/067144 | | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

Wikipedia, "Fibre Channel Zoning," https://en.wikipedia.org/wiki/Fibre_Channel_zoning, Aug. 19, 2020, 2 pages.

E. Smith, "Introducing Target Driven Zoning (TDZ)" https://brasstacksblog.typepad.com/brass-tacks/2012/01/introducing-target-driven-zoning-tdz.html, Jan. 16, 2012, 9 pages.

Broadcom, "Fabric Operating System 9.0," Technical Brief, Fabric Notifications, FOS-90-Fabric-Notifications-OT101, Nov. 4, 2020, 12 pages.

Brocade, "Brocade Guide to Undertanding Zoning," vol. 1, 2002, 27 pages.

A. Wasson, "General Rules and Limits for Auto-Provisioning on Symmetric VMAX," http://community.emc.com/docs/ DOC-16553, May 8, 2012, 2 pages.

* cited by examiner

AUTOMATED ZONING SET SELECTION TRIGGERED BY SWITCH FABRIC NOTIFICATIONS

FIELD

The field relates generally to information processing systems, and more particularly to storage in information processing systems.

BACKGROUND

A switch fabric provides a network topology for interconnecting nodes or devices via one or more switches. In a Fibre Channel (FC) switch fabric topology, nodes or devices are interconnected through one or more FC switches. FC zoning may be used to control visibility among the nodes or devices in the FC switch fabric by partitioning the FC switch fabric into subsets or zones with simplified management and added security where nodes or devices within a zone are generally allowed access only to other nodes or devices in that zone. FC zoning may be implemented using a variety of techniques, including soft and hard zoning, through switch ports, through World Wide Names (WWNs) of nodes or devices, and/or other techniques. Such arrangements are commonly utilized to interconnect host devices with storage nodes in a distributed storage system.

SUMMARY

Illustrative embodiments provide techniques for automated zoning set selection triggered by fabric performance impact notifications (FPINs) or other types of notifications generated by switches of a switch fabric that interconnects one or more host devices with a distributed storage system or other type of storage system. For example, some embodiments are configured to allow a data protection appliance coupled to a storage area network (SAN) to receive one or more FPINs from FC switches of an FC switch fabric of the SAN, and to generate, responsive to the one or more received FPINs, an in-band command directing the FC switches to select a particular one of a plurality of pre-defined zoning sets.

Such embodiments advantageously allow the zoning configuration of the switch fabric to automatically vary over time in a manner that is highly responsive to performance issues, thereby reducing the burden on SAN administrators and improving overall performance of the storage system. Moreover, by allowing pre-defined zoning sets to be defined by the SAN administrator, illustrative embodiments can ensure that the SAN administrator maintains control over the zoning configuration of the SAN.

In one embodiment, an apparatus comprises at least one processing device that includes a processor coupled to a memory. The processing device is configured to receive at least one notification from a switch of a switch fabric coupled between one or more host devices and a storage system, to select a particular one of a plurality of zoning sets based at least in part on the one or more received notifications, and to send an indication of the selected zoning set to the switch.

In some embodiments, the processing device comprises a data protection appliance coupled to a storage area network that includes the switch fabric.

Additionally or alternatively, the processing device can comprise at least one of the one or more host devices. Other types and arrangements of one or more processing devices can be used to implement automated zoning set selection triggered by switch fabric notifications in other embodiments.

The switch may comprise an FC switch of an FC switch fabric, and the notification may comprise FPINs generated by the FC switch, although other types of switches, switch fabrics and notifications can be used in other embodiments.

The indication of the selected zoning set illustratively comprises a command that instructs the switch to alter its zoning configuration in accordance with the selected zoning set. Other types of indications of the selecting selected zoning set are similarly configured to cause the switch to alter its zoning configuration.

In some embodiments, sending an indication of the selected zoning set to the switch comprises generating at least one command that includes information characterizing the selected zoning set, and sending the command to the switch. The command is illustratively configured to instruct the switch to alter its zoning configuration in accordance with the information characterizing the selected zoning set. The command may comprise an in-band command or another type of command.

A given one of the plurality of zoning sets in some embodiments comprises zoning configuration information for each of one or more zones configured utilizing the switch fabric. The zoning configuration information for a particular one of the zones comprises an identifier of a particular port of one of the one or more host devices, and an identifier of a particular port of the storage system. The identifiers illustratively comprise respective WWNs of the host and storage array ports.

In some embodiments, selecting a particular one of a plurality of zoning sets based at least in part on the one or more received notifications comprises selecting a first one of the plurality of zoning sets responsive to the one or more received notifications indicating a first type of performance issue, and selecting a second one of the plurality of zoning sets different than the first zoning set responsive to the one or more received notifications indicating a second type of performance issue different than the first type of performance issue. Other types of selection, including random selection, round robin selection and other notification type based selection, can additionally or alternatively be used.

The processing device in some embodiments is further configured to perform at least one filtering operation on the one or more received notifications in order to determine whether or not a zoning configuration change is appropriate, illustratively before performing the selecting of the particular zoning set and the sending of the indication of the selected zoning set to the switch. For example, the filtering operation can implement a hysteresis effect by limiting a number of zoning configuration changes that can be made within a specified time period.

Additionally or alternatively, the switch in some embodiments is configured to implement an arbitration mechanism to resolve command conflicts in situations in which the switch receives multiple commands from respective different processing devices, such as multiple distinct data protection appliances and/or host devices, each instructing a zoning configuration change for the switch.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
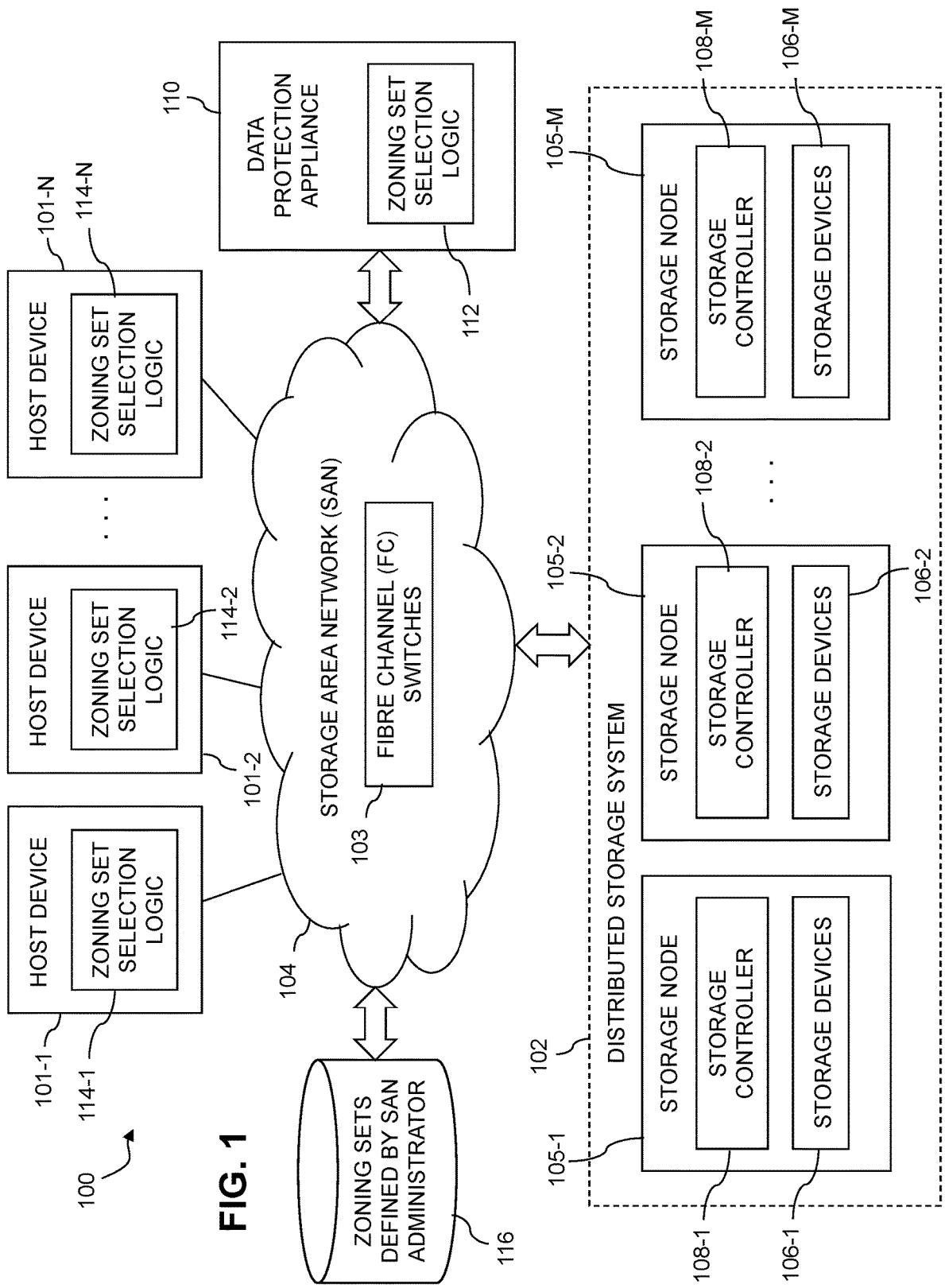
FIG. 1 is a block diagram of an information processing system incorporating functionality for automated zoning set selection triggered by switch fabric notifications in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a distributed storage system 102 shared by the host devices 101. The host devices 101 and distributed storage system 102 in this embodiment are configured to communicate with one another via Fibre Channel (FC) switches 103 that are part of one or more FC switch fabrics of an FC storage area network (SAN) 104. The distributed storage system 102 more particularly comprises storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is one possible example of what is more generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, each of the storage nodes 105 may be viewed as a separate storage array with its own logical address space. The term "storage node" as used herein is therefore intended to be broadly construed.

Each of the storage nodes 105 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (TO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are being concurrently processed in the system in some embodiments are referred to herein as "in-flight" IOs that have been admitted by the storage nodes 105 to further processing within the system 100. The storage nodes 105 are illustratively configured to queue IO operations arriving from one or more of the host devices 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms.

The host devices 101 are illustratively configured to write data to and read data from the distributed storage system 102 comprising storage nodes 105 in accordance with applications executing on those host devices 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than SAN 104 each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand or Gigabit Ethernet, in addition to or in place of FC. Numerous alternative networking arrangements are possible in a given embodiment, as will be appreciated by those skilled in the art.

The first storage node 105-1 comprises a plurality of storage devices 106-1 and an associated storage controller 108-1. The storage devices 106-1 store metadata pages and user data pages associated with one or more storage volumes of the distributed storage system. The storage volumes illustratively comprise respective logical units (LUNs) or other types of logical storage volumes. The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage controller 108-2, and storage node 105-M comprises a plurality of storage devices 106-M and an associated storage controller 108-M.

The storage devices 106-2 through 106-M store metadata pages and user data pages associated with one or more storage volumes of the distributed storage system 102, such as the above-noted LUNs. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 105 via remote interfaces. For example, it is assumed in some embodiments disclosed herein that each of the storage devices 106 on a given one of the storage nodes 105 can be accessed by the given storage node via its local interface, or by any of the other storage nodes via a remote direct memory access (RDMA) interface. A given storage application executing on the storage nodes 105 illustratively requires that all of the storage nodes 105 be able to access all of the storage devices 106. Such access to local persistent storage of each node from the other storage nodes can be performed, for example, using the RDMA interfaces with the other storage nodes, although numerous other arrangements are possible.

The storage controllers 108 of the storage nodes 105 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 105 of the distributed storage system of FIG. 1.

In some embodiments, the storage nodes 105 of the distributed storage system collectively provide a scale-out storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 105 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

Some embodiments disclosed herein are configured to utilize one or more RAID arrangements to store data across the storage devices 106 in each of one or more of the storage nodes 105 of the distributed storage system 102.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage controllers 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes an array of n different "disks" denoted 1 through n, each a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the disks in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments.

In some embodiments, the storage nodes 105 of the distributed storage system of FIG. 1 are connected to each other in a full mesh network, and are collectively managed by a system manager. A given set of local persistent storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises a data protection appliance 110 coupled to the SAN 104. The data protection appliance 110 is illustratively configured to create backups, snapshots or other copies of one or more LUNs or other logical storage devices of the distributed storage system 102, so as to provide protection for the corresponding data within the system 100. For example, the data protection appliance 110 can control replication of data between a production storage array and a recovery storage array within the distributed storage system 102. Numerous other types of data protection can additionally or alternatively be provided in the system 100 under the control of the data protection appliance 110. It is assumed that the data protection appliance 110 is configured to register with one or more switch fabrics of the SAN 104 in order to receive FPINs from the FC switches 103.

Examples of data protection appliances that can be adapted for use in illustrative embodiments disclosed herein include data protection appliances associated with products such as Data Domain, RecoverPoint, PowerProtect Data Manager (PPDM) and Integrated Data Protection Appliance (IDPA). However, the term "data protection appliance" as used herein is intended to be broadly construed.

The data protection appliance 110 includes zoning set selection logic 112. The zoning set selection logic 112 is utilized in performing automated zoning set selection triggered by FPINs or other types of switch fabric notifications, as will be described in more detail below.

The host devices 101 similarly include respective instances of zoning set selection logic 114-1, 114-2, . . . 114-N. Such instances of zoning set selection logic 114 are also utilized in performing automated zoning set selection triggered by FPINs or other types of switch fabric notifications, as will be described in more detail below.

It is to be appreciated that automated zoning set selection as disclosed herein can be performed by the data protection appliance 110, by one or more of the host devices 101, and/or by other system components. Accordingly, in some embodiments, the zoning set selection logic 112 of the data protection appliance 110 can be eliminated, with the automated zoning set selection functionality being implemented only by one or more of the host devices 101. As another example, in other embodiments, the zoning set selection logic 114 of the host devices 101 can be eliminated, with the automated zoning set selection functionality being implemented only by the data protection appliance 110.

In implementing automated zoning set selection as disclosed herein, the zoning set selection logic 112 of the data protection appliance 110 and/or one or more instances of the zoning set selection logic 114 of the host devices 101 utilize zoning sets 116 defined by an administrator of the SAN 104. Such an arrangement advantageously allows the SAN administrator to maintain control over the zoning configuration of the SAN while also allowing the system 100 to dynamically vary that zoning configuration in order to address performance issues indicated by received FPINs or other switch fabric notifications.

The host devices 101 can comprise additional or alternative components. For example, in some embodiments the host devices 101 further comprise respective sets of IO queues and respective multi-path input-output (MPIO) drivers. The MPIO drivers collectively comprise a multi-path layer of the host devices 101. Path selection functionality for delivery of IO operations from the host devices 101 to the distributed storage system 102 is provided in the multi-path layer by respective instances of path selection logic implemented within the MPIO drivers. In some embodiments, the instances of zoning set selection logic 114 are implemented at least in part within the MPIO drivers of the host devices 101.

The MPIO drivers may comprise, for example, otherwise conventional MPIO drivers, such as PowerPath® drivers from Dell Technologies, suitably modified in the manner disclosed herein to provide functionality for automated zoning set selection. Other types of MPIO drivers from other driver vendors may be suitably modified to incorporate functionality for automated zoning set selection as disclosed herein.

In some embodiments, the host devices 101 comprise respective local caches, implemented using respective memories of those host devices. A given such local cache can be implemented using one or more cache cards. A wide variety of different caching techniques can be used in other embodiments, as will be appreciated by those skilled in the art. Other examples of memories of the respective host devices 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers are illustratively configured to deliver IO operations selected from their respective sets of IO queues to the distributed storage system 102 via selected ones of multiple paths over the SAN 104. The sources of the IO operations stored in the sets of IO queues illustratively include respective processes of one or more applications executing on the host devices 101. For example, IO operations can be generated by each of multiple processes of a database application running on one or more of the host devices 101. Such processes issue IO operations for delivery to the distributed storage system 102 over the SAN 104. Other types of sources of IO operations may be present in a given implementation of system 100.

A given IO operation is therefore illustratively generated by a process of an application running on a given one of the host devices 101, and is queued in one of the IO queues of the given host device with other operations generated by other processes of that application, and possibly other processes of other applications.

The paths from the given host device to the distributed storage system 102 illustratively comprise paths associated with respective initiator-target pairs, with each initiator comprising a host bus adaptor (HBA) or other initiating entity of the given host device and each target comprising a port or other targeted entity corresponding to one or more of the storage devices 106 of the distributed storage system 102. As noted above, the storage devices 106 illustratively comprise LUNs or other types of logical storage devices.

In some embodiments, the paths are associated with respective communication links between the given host device and the distributed storage system 102 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver of the given host device in delivering IO operations from the IO queues of that host device to the distributed storage system 102 over particular paths via the SAN 104. Each such IO operation is assumed to comprise one or more commands for instructing the distributed storage system 102 to perform particular types of storage-related functions such as reading data from or writing data to particular logical volumes of the distributed storage system 102. Such commands are assumed to have various payload sizes associated therewith, and the payload associated with a given command is referred to herein as its "command payload."

A command directed by the given host device to the distributed storage system 102 is considered an "outstanding" command until such time as its execution is completed in the viewpoint of the given host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the given host device and that the targets of the plurality of initiator-target pairs comprise respective ports of the distributed storage system 102. Examples of such HBAs and storage array ports are illustrated in conjunction with the embodiment of FIG. 3.

Selecting a particular one of multiple available paths for delivery of a selected one of the IO operations from the given host device is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume to which the particular IO operation is directed.

It should be noted that paths may be added or deleted between the host devices 101 and the distributed storage system 102 in the system 100. For example, the addition of one or more new paths from the given host device to the distributed storage system 102 or the deletion of one or more existing paths from the given host device to the distributed storage system 102 may result from respective addition or deletion of at least a portion of the storage devices 106 of the distributed storage system 102.

Addition or deletion of paths can also occur as a result of zoning and masking changes or other types of storage system reconfigurations performed by a storage administrator or other user. Some embodiments are configured to send a predetermined command from the given host device to the distributed storage system 102, illustratively utilizing the MPIO driver, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the distributed storage system 102 as well to discover the disappearance of any existing LUNs that have been deleted from the distributed storage system 102.

The MPIO driver of the given host device in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an Operating System (OS) kernel of the given host device.

For each of one or more new paths identified in the path discovery scan, the given host device may be configured to execute a host registration operation for that path. The host registration operation for a given new path illustratively provides notification to the distributed storage system 102 that the given host device has discovered the new path.

As indicated previously, the storage nodes 105 of the distributed storage system 102 process IO operations from one or more host devices 101 and in processing those IO operations run various storage application processes that generally involve interaction of that storage node with one or more other ones of the storage nodes.

In the FIG. 1 embodiment, the distributed storage system 102 comprises storage controllers 108 and corresponding sets of storage devices 106, and may include additional or alternative components, such as sets of local caches.

The storage controllers 108 illustratively control the processing of IO operations received in the distributed storage system 102 from the host devices 101. For example, the storage controllers 108 illustratively manage the processing of read and write commands directed by the MPIO drivers of the host devices 101 to particular ones of the storage devices 106. The storage controllers 108 can be implemented as respective storage processors, directors or other storage system components configured to control storage system operations relating to processing of IO operations. In some embodiments, each of the storage controllers 108 has a different one of the above-noted local caches associated therewith, although numerous alternative arrangements are possible.

The manner in which the system 100 is configured to implement automated zoning set selection will now be described in greater detail.

In illustrative embodiments, at least one processing device, such as a processing device that implements the data protection appliance 110 and/or one of the host devices 101, is configured to receive at least one notification from at least one of the FC switches 103 of the SAN 104, to select a particular one of the plurality of zoning sets 116 based at least in part on the one or more received notifications, and to send an indication of the selected zoning set to the at least one of the FC switches 103.

Although in some embodiments the switch providing the notification comprises a given one of the FC switches 103 of an FC switch fabric, and the notification comprises one or more FPINs generated by the FC switch, other types of switches, switch fabrics and notifications can be used in other embodiments. The FC switches 103 are also referred to in some parts of the following description as simply "switches."

The FPINs are defined by the FC standard and are typically utilized by the FC switches 103 to report performance issues associated with the FC switches 103 and possible causes of those performance issues. For example, FPINs may be sent by the FC switches 103 to designated endpoints to provide alerts on traffic issues, such as congestion points, slow drain, too much load from a specific initiator, etc. The FC switches 103 analyze the network situation and alert the appropriate endpoints to provide these and other types of information about various performance problems.

The term "zoning set" as used herein is intended to be broadly construed, so as to encompass, for example, a grouping of zone definitions. Such definitions can vary depending upon the switch vendor. For example, groupings of zone definitions or portions thereof may be referred to as "sets" in the context of Cisco FC switches, and "configs" in the context of Brocade FC switches. The term "zoning set" as used herein is intended to broadly encompass these and other groupings of zone definitions. It is possible that such a zoning set as broadly used herein can contain only a single zone definition, or multiple separate zone definitions, possibly with each enabled or disabled by name or other identifier. Additional examples of zoning sets that can be utilized in illustrative embodiments disclosed herein are described in U.S. Pat. No. 10,523,513, entitled "Automated Configuration of Switch Zones in A Switch Fabric," which is incorporated by reference herein in its entirety.

The above-noted indication of the selected zoning set sent to at least one of the FC switches 103 illustratively comprises a command that instructs the switch to alter its zoning configuration in accordance with the selected zoning set. Other types of indications of the selected zoning set are similarly configured to cause the switch to alter its zoning configuration.

In some embodiments, sending an indication of the selected zoning set to the switch comprises generating at least one command that includes information characterizing the selected zoning set, and sending the command to the switch. The command is illustratively configured to instruct the switch to alter its zoning configuration in accordance with the information characterizing the selected zoning set. The command may comprise an in-band command or another type of command. The term "in-band command" refers to a command that conforms to a zoning configuration interface of the FC standard, such as a create command, an enable command, a disable command, or combinations of these and other commands.

A given one of the plurality of zoning sets in some embodiments comprises zoning configuration information for each of one or more zones configured utilizing the switch fabric. The zoning configuration information for a particular one of the zones comprises an identifier of a particular port of one of the one or more host devices, and an identifier of a particular port of the storage system. The host device ports may more particularly comprise particular HBA ports. The identifiers illustratively comprise respective WWNs of the host port and storage array port. More particularly, the identifiers can comprises WWPNs of the host port and storage array port, where WWPN denotes a World Wide Port Name. The zoning configuration information for a particular one of the zones can more particularly comprise one or more WWPNs of one or more host device ports and one or more WWPNs of one or more storage array ports, although numerous other arrangements are possible.

In some embodiments, selecting a particular one of a plurality of zoning sets based at least in part on the one or more received notifications comprises selecting a first one of the plurality of zoning sets responsive to the one or more received notifications indicating a first type of performance issue, and selecting a second one of the plurality of zoning sets different than the first zoning set responsive to the one or more received notifications indicating a second type of performance issue different than the first type of performance issue. Other types of selection, including random selection, round robin selection and other notification type based selection, can additionally or alternatively be used.

The processing device in some embodiments is further configured to perform at least one filtering operation on the one or more received notifications in order to determine whether or not a zoning configuration change is appropriate, illustratively before performing the selecting of the particular zoning set and the sending of the indication of the selected zoning set to the switch. For example, the filtering operation can implement a hysteresis effect by limiting a number of zoning configuration changes that can be made within a specified time period.

Additionally or alternatively, the switch in some embodiments is configured to implement an arbitration mechanism to resolve command conflicts in situations in which the switch receives multiple commands from respective different processing devices, such as multiple distinct data protection appliances and/or host devices, each instructing a zoning configuration change for the switch.

The automated zoning set selection disclosed herein advantageously reduces the burden on SAN administrators by providing dynamic adaptation between different zoning sets based at least in part on FPINs or other notifications sent by the FC switches 103 to the host devices 101 and/or data protection appliance 110. Absent such techniques, SAN administrators are often required to manually perform zoning configuration changes in order to address path and load problems, based on requests received from other administrators, such as an administrator of the distributed storage system 102 (a "storage administrator") and/or an administrator of the data protection appliance 110 (a "backup administrator"). For example, an FPIN sent to a storage administrator or a backup administrator by one of the FC switches 103 may signal a degradation on a particular path, such that the storage administrator or backup administrator receiving such an FPIN notification will then need to contact the SAN administrator to ask for a zoning configuration change. This conventional approach is manual and slow, and is avoided in illustrative embodiments disclosed herein.

For example, illustrative embodiments utilize FPIN notifications received in the host devices 101 and/or data protection appliance 110 from the FC switches 103 to trigger selection and implementation of different ones of the zoning sets 116 defined by the SAN administrator via in-band commands directed by the host devices 101 and/or data protection appliance 110 back to the FC switches 103.

In some embodiments, a given zoning configuration implemented by the FC switches 103 segregates initiators, such as HBAs of the host devices 101, and targets, such as ports of the distributed storage system 102, to create partitioned networks so that data traffic can be routed more effectively for enhanced security and performance.

Zoning configuration changes are used in illustrative embodiments in order to overcome performance problems, and can involve, for example, adding or removing ports, isolating hosts or segregating networks. SAN administrators generally like to maintain control over the FC switch zoning configurations, and are therefore reluctant to allow zoning configuration changes that are not under their control. Illustrative embodiments disclosed herein advantageously reduce the burden on SAN administrators while also allowing them to maintain a significant level of control over the particular zoning configuration changes that are made, through their definition of the zoning sets 116.

Many performance issues can be addressed by these zoning configuration changes. For example, changes in zoning affect traffic patterns and can change the load by spreading or concentrating traffic. Such zoning configuration changes can also exchange local and global maximums that may alleviate traffic issues.

In some embodiments, the SAN administrator predefines multiple zoning options (e.g., using "sets" or "configs") and host devices 101 and/or data protection appliance 110 are configured to receive FPINs, and in response to particular detected performance issues indicated by the FPINs, to send an in-band command to the switch to select a different zoning set between the predefined options. Such functionality is illustratively performed by the instances of zoning set selection logic deployed within the host devices 101 and/or the data protection appliance 110 as disclosed herein.

Such arrangements as disclosed herein leave the control over zoning set definitions with the SAN administrator, while allowing automation of zoning configuration changes when performance issues are encountered. This solution has the potential of resolving both local and global performance issues based on the information provided by the FPINs and the scope of the zoning configuration changes.

In some embodiments, an algorithm for automated zoning set selection triggered by FPINs or other switch fabric notifications illustratively includes the following steps.

1. Definition—The SAN administrator creates a predefined set of zoning options in the form of zoning sets 116 as disclosed herein.
2. Discovery—The data protection appliance 110 is made aware of the available zoning sets 116. For example, the data protection appliance 110 can obtain the available zoning sets from the FC switches 103 of the SAN 104, and/or from the SAN administrator. Additionally or alternatively, the data protection appliance 110 is made aware of the naming convention of the zoning sets 116 (e.g., Zoning_01, Zoning 02, . . . or Primary_ Zoning/Backup_Zoning, etc.), so as to facilitate discovery.
3. Notification—The data protection appliance 110 registers to receive FPINs from the FC switches 103.
4. Handling—The data protection appliance 110 implements one or more handlers as part of its zoning set selection logic 112 to send one or more of the FC switches 103 a command to change to a different zoning set in the zoning sets 116. A given such handler can also log the change and send a notification to a user of the data protection appliance 110 to facilitate coordination with the SAN administrator.

Although the above example algorithm is described in the context of data protection appliance 110 and its zoning set selection logic 112, similar algorithms can additionally or alternatively be implemented by each of the host devices 101 utilizing their instances of zoning set selection logic 114.

As indicated previously, various techniques can be used to select between the different available zoning sets, including random selection, round robin selection and notification type based selection.

For example, a given handler can be configured to perform round robin selection between the zoning sets in the order in which the zoning sets were discovered.

As another example, the given handler can be configured to perform selection according to the contents of a particular received FPIN (e.g., general congestion—select zoning set 1, initiator specific—select zoning set 2, other—select zoning set 3) with the mapping between FPIN types and the zoning sets being defined by an administrator, or derived based on convention and/or analysis.

Also as indicated previously, some embodiments perform at least one filtering operation on the one or more received notifications in order to determine whether or not a zoning configuration change is appropriate, illustratively before performing the selecting of the particular zoning set and the sending of the indication of the selected zoning set to the switch. For example, the filtering operation can implement a hysteresis effect by limiting a number of zoning configuration changes that can be made within a specified time period. Absent such a limitation, several FPINs may arrive in quick succession and using a selection option like round robin selection may cause excessively rapid application of different zoning sets. Moreover, it takes time from the deployment of a newly selected zoning set until the impact of the corresponding zoning configuration change is reflected in the data traffic.

Accordingly, illustrative embodiments can be advantageously configured to limit the number of zoning set changes that can be applied within a given time period. For example, only one zoning set change may be permitted in each five-minute interval, although other numbers of zoning set changes and/or time intervals can be used. Such an arrangement allows a zoning configuration change sufficient time to "settle in" and start impacting the data traffic before decisions on additional changes are made.

Also as mentioned above, the FC switches 103 in some embodiments may each implement an arbitration mechanism to resolve command conflicts in situations in which the switch receives multiple commands from respective different processing devices, such as multiple distinct data protection appliances and/or host devices, each instructing a zoning configuration change for the switch. For example, multiple data protection appliances coupled to the SAN 104 may each request a different zoning configuration change.

In some embodiments, the arbitration mechanism is implemented by enforcing the above-described hysteresis time period on the switch, with the switch accepting the first command that arrives within a given time period.

Other examples of arbitration mechanisms that can be used in illustrative embodiments include one or more of the following:

1. An administrator defines priority between multiple data protection appliances.
2. The data protection appliance with the lowest WWN or other identifier is the one permitted to make the change. This can be determined within the SAN, possibly by the switch itself.
3. A witness, leader or other arbitrator entity is elected or otherwise created to select the data protection appliance that is permitted to make the change.
4. Random selection between the data protection appliances.
5. Round robin selection between the data protection appliances.

Similar arbitration mechanisms can be applied to arbitrate between zoning changes received from multiple host devices, in addition to or in place of the zoning changes received from multiple data protection appliances, or to arbitrate between zoning changes received from one or more host devices and a single data protection appliance.

These and other features of illustrative embodiments disclosed herein are examples only, and should not be construed as limiting in any way. Other types of automated zoning set selection may be used in other embodiments, and the term "zoning set selection" as used herein is intended to be broadly construed. For example, in some embodiments, the selection of a different zoning set can be carried out by determining a particular command to be sent to a switch to cause the switch to adjust its zoning configuration to a next predefined zoning set in a sequence of zoning sets in which progress through the sequence responsive to received commands is also predefined. Accordingly, such an arrangement is viewed as falling within the term "zoning set selection" as broadly used herein.

An additional example of an illustrative process for implementing at least some of the above-described automated zoning set selection functionality will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

As another example, the storage nodes 105 in some embodiments are part of a distributed content addressable storage system in which logical addresses of data pages are mapped to physical addresses of the data pages in the storage devices 106 using respective hash digests, hash handles or other content-based signatures that are generated from those data pages using a secure hashing algorithm. A wide variety of other types of distributed storage systems can be used in other embodiments.

Also, the term "storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array.

Communication links may be established between the various processing modules of the storage nodes using well-known communication protocols such as TCP/IP and RDMA. For example, respective sets of IP links used in data transfer and corresponding messaging could be associated with respective different ones of the routing modules.

The particular features described above in conjunction with FIG. 1 should not be construed as limiting in any way, and a wide variety of other system arrangements with corresponding instances of zoning set selection logic are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated host devices 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the host devices 101 and the storage nodes 105 to reside in different data centers. Numerous other distributed implementations of the storage nodes 105 and their respective associated sets of host devices 101 are possible.

Additional examples of processing platforms utilized to implement storage systems and possibly their associated host devices in illustrative embodiments will be described in more detail below in conjunction with FIGS. 4 and 5.

It is to be appreciated that these and other features of illustrative embodiments are presented by way of example only, and should not be construed as limiting in any way.

Accordingly, different numbers, types and arrangements of system components such as host devices 101, distributed storage system 102, SAN 104, storage nodes 105, storage devices 106, storage controllers 108, zoning set selection logic 112 and 114 and zoning sets 116 can be used in other embodiments.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of automated zoning set selection functionality as disclosed herein can be implemented in one or more host devices, in a storage system, or partially in a host device and partially in a storage system. Accordingly, illustrative embodiments are not limited to arrangements in which automated zoning set selection functionality is implemented primarily in a particular host device and/or a data protection appliance, and therefore such embodiments encompass various alternative arrangements, such as, for example, an arrangement in which the functionality is implemented in a storage system, or distributed over one or more storage systems and one or more associated host devices, each comprising one or more processing devices.

The operation of the information processing system 100 will now be described in further detail with reference to the flow diagram of the illustrative embodiment of FIG. 2, which illustrates a process for implementing automated zoning set selection. This process may be viewed as an example algorithm implemented at least in part by the zoning set selection logic 112 of the data protection appliance 110, although similar processes can additionally or alternatively be implemented at least in part by the instances of zoning set selection logic 114 in one or more of the host devices 101 of system 100. These and other algorithms for automated zoning set selection as disclosed herein are more generally applicable to other types of components of an information processing system.

Figure 2:
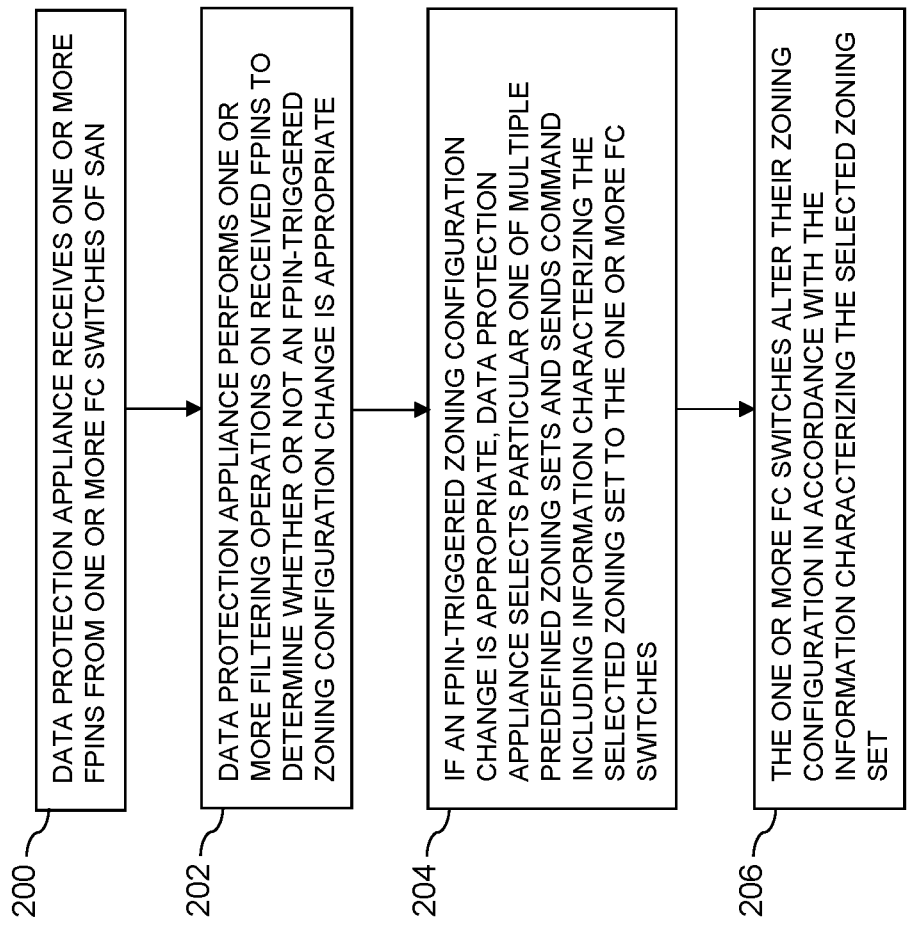
FIG. 2 is a flow diagram of a process for automated zoning set selection triggered by switch fabric notifications in an illustrative embodiment.

Referring now to FIG. 2, an automated zoning set selection process as illustrated includes steps 200 through 206, and is assumed to be implemented primarily by data protection appliance 110 utilizing its instance of zoning set selection logic 112. Additionally or alternatively, similar processes may be implemented primarily by each of the host devices 101 utilizing their respective instances of zoning set selection logic 114.

In step 200, the data protection appliance 110 receives one or more FPINs from one or more of the FC switches 103 of the SAN 104. It is assumed that the data protection appliance 110 has previously registered with one or more switch fabrics of the SAN 104 in order to receive such FPINs.

In step 202, the data protection appliance 110 performs one or more filtering operations on the received FPINs to determine whether or not an FPIN-triggered zoning configuration change is appropriate. For example, such a filtering operation may implement a hysteresis effect as described previously.

In step 204, if the data protection appliance 110 has determined in step 202 that an FPIN-triggered zoning configuration change is appropriate, the data protection appliance 110 selects a particular one of multiple predefined zoning sets 116 and sends a command including information characterizing the selected zoning set to the one or more FC switches 103.

In step 206, the one or more FC switches 103 alter their zoning configuration in accordance with the information characterizing the selected zoning set. Step 206 may be performed in conjunction with an arbitration mechanism of the type previously described.

Steps 200 through 206 are illustratively repeated for multiple iterations by the data protection appliance 110 upon receipt of different FPINs or sets of multiple FPINs from the FC switches 103 of one or more switch fabrics of the SAN 104. As indicated above, the process including steps 200 through 206 may be similarly performed in other embodiments by one or more of the host devices 101, in addition to or in place of performance of the process by the data protection appliance 110.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing automated zoning set selection in an information processing system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated zoning set selection processes for respective different data protection appliances and/or host devices of the information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Host devices and/or data protection appliances can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, data protection appliances, storage controllers and other system components may be implemented at least in part using processing devices of such processing platforms. For example, respective logic instances of host devices and/or data protection appliances can be implemented in respective containers running on respective ones of the processing devices of a processing platform.

Figure 3:
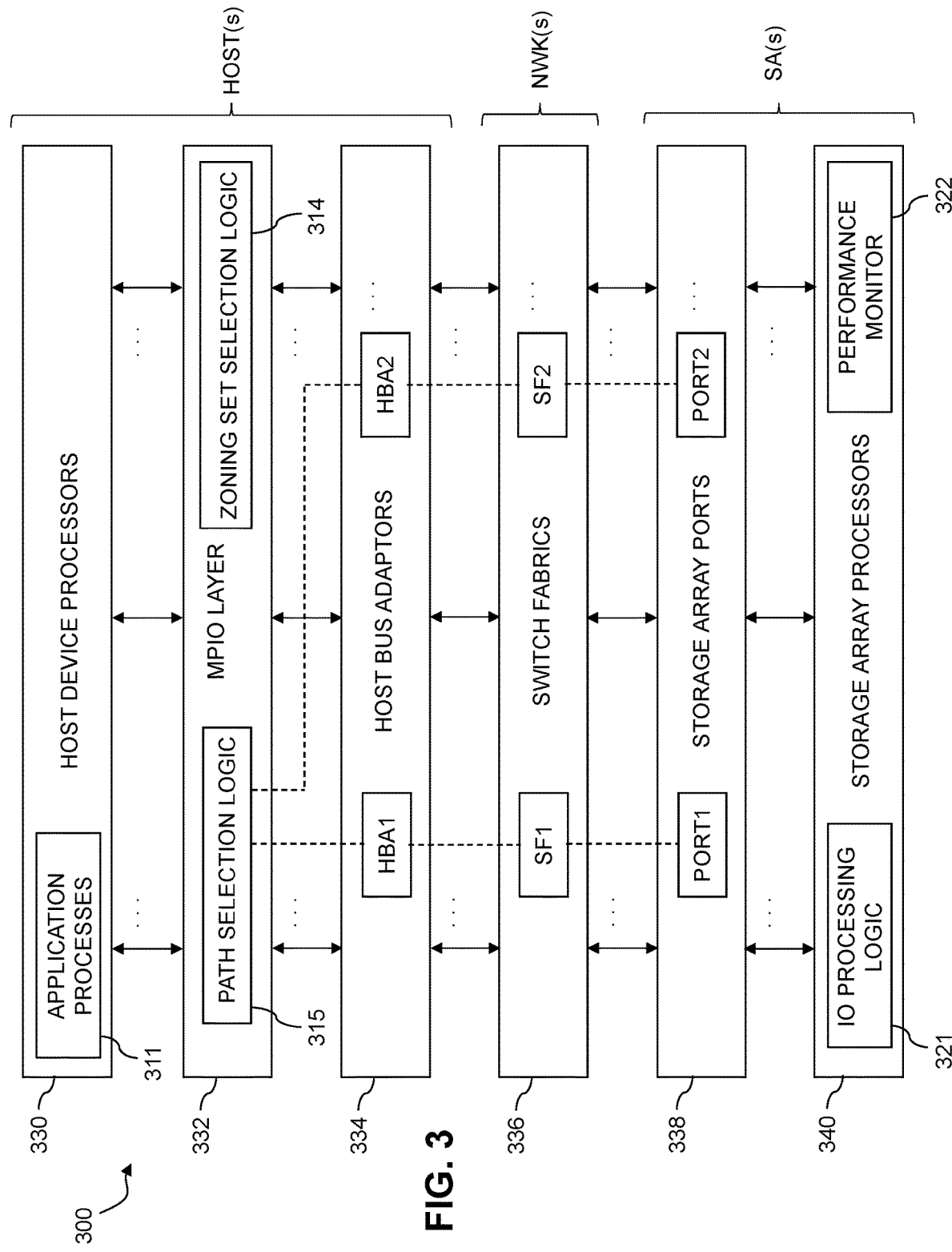
FIG. 3 shows another example of an information processing system incorporating functionality for automated zoning set selection triggered by switch fabric notifications in an illustrative embodiment.

Referring now to FIG. 3, another illustrative embodiment is shown. In this embodiment, an information processing system 300 comprises host-side elements that include application processes 311, zoning set selection logic 314 and path selection logic 315, and storage-side elements that include IO processing logic 321 and performance monitor 322. The zoning set selection logic 314 is configured to control automated selection of a particular zoning set from multiple available zoning sets, illustratively defined by a SAN administrator or other user. There may be separate instances of one or more such elements associated with each of a plurality of system components such as host devices and storage arrays of the system 300. For example, different instances of the zoning set selection logic 314 are illustratively implemented in respective ones of a plurality of MPIO drivers of respective host devices.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

In a manner similar to that described elsewhere herein, the zoning set selection logic 314 in the present embodiment is configured to receive at least one FPIN or other type of notification from a switch of a switch fabric of a SAN coupled between the one or more host devices and the one or more storage arrays, to select a particular one of a plurality of zoning sets based at least in part on the one or more received notifications, and to send an indication of the selected zoning set to the switch. The switch implements a zoning configuration change based on the indication of the selected zoning set.

The system 300 in this embodiment therefore implements automated zoning set selection utilizing one or more MPIO drivers of the MPIO layer 332, and associated instances of zoning set selection logic 314.

The application processes 311 generate IO operations that are processed by the MPIO layer 332 for delivery to the one or more storage arrays. Paths are determined by the path selection logic 315 for sending such IO operations to the one or more storage arrays. These IO operations are sent to the one or more storage arrays in accordance with one or more scheduling algorithms, load balancing algorithms and/or other types of algorithms. Selection and/or adaptation of such algorithms can be responsive at least in part to information obtained from performance monitor 322 of the storage array processor layer 340.

The MPIO layer 332 is an example of what is also referred to herein as a multi-path layer, and comprises one or more MPIO drivers implemented in respective host devices. Each such MPIO driver illustratively comprises respective instances of zoning set selection logic 314 and path selection logic 315 configured as previously described. Additional or alternative layers and logic arrangements can be used in other embodiments.

The IO processing logic 321 implemented in the storage array processor layer 340 controls the processing of read requests, write requests and other commands received from the MPIO drivers of the one or more host devices.

In the system 300, path selection logic 315 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 315 of the MPIO layer 332 in this embodiment selects paths for delivery of IO operations to the one or more storage arrays having the storage array ports of the storage array port layer 338. More particularly, the path selection logic 315 determines appropriate paths over which to send particular IO operations to particular logical storage devices of the one or more storage arrays.

It is assumed in this embodiment that the host devices through their respective MPIO drivers and respective instances of zoning set selection logic 314 provide functionality for automated zoning set selection triggered by switch fabric notifications, illustratively with involvement of other system components including at least the FC switches of the switch fabric layer 336.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions. Dynamic changes in zoning configurations as disclosed herein are carried out at least in part by interaction between the zoning set selection logic 314 and FC switches of the switch fabric layer 336.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

These and other embodiments disclosed herein provide significant advantages over conventional approaches.

For example, illustrative embodiments provide automated zoning set selection implemented by a host device, data protection appliance or other system component configured to interact with switches of one or more switch fabrics.

In some embodiments, FPINs or other switch fabric notifications are used to trigger a change in zoning from a predefined selection of zoning sets, possibly with filtering to overcome hysteresis and an arbitration mechanism.

Such embodiments advantageously allow the zoning configuration of the switch fabric to automatically vary over time in a manner that is highly responsive to performance issues, thereby reducing the burden on SAN administrators and improving overall performance of the storage system.

Moreover, by allowing pre-defined zoning sets to be defined by the SAN administrator, illustrative embodiments can ensure that the SAN administrator maintains control over the zoning configuration of the SAN.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed storage systems with automated zoning set selection functionality will now be described in greater detail with reference to FIGS. 4 and 5. Although described in the context of system 100, these platforms may also be used to implement at least portions of other information processing systems in other embodiments.

Figure 4:
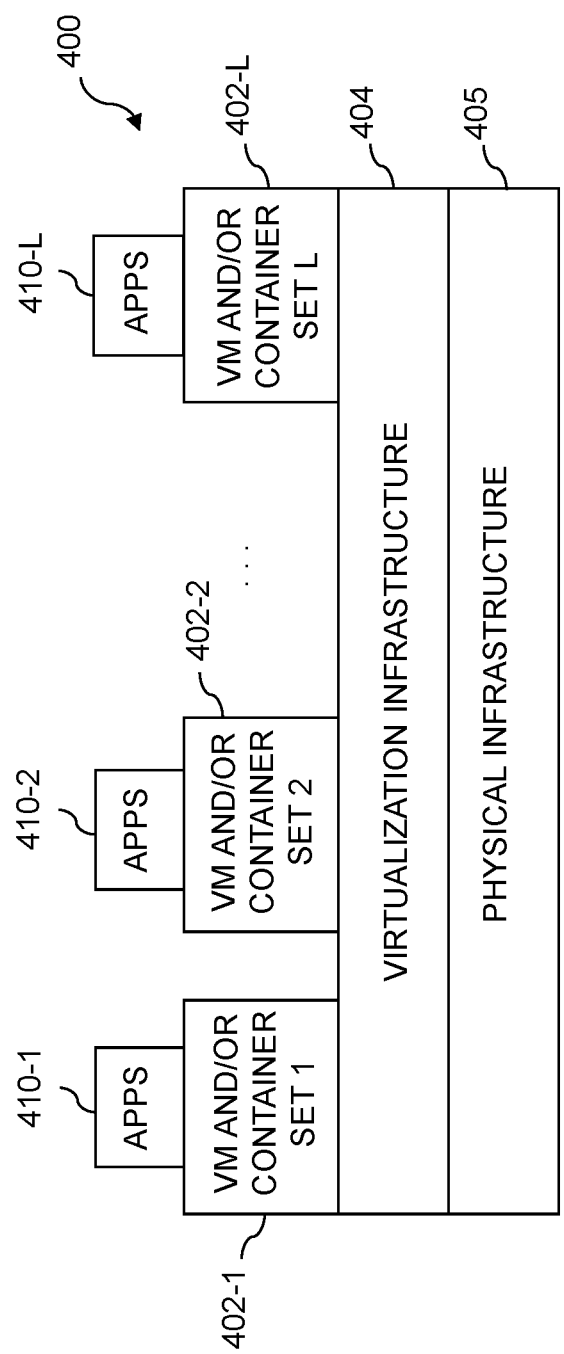
FIGS. 4 and 5 show examples of processing platforms that may be utilized to implement at least a portion of an information processing system in illustrative embodiments.
Figure 5:
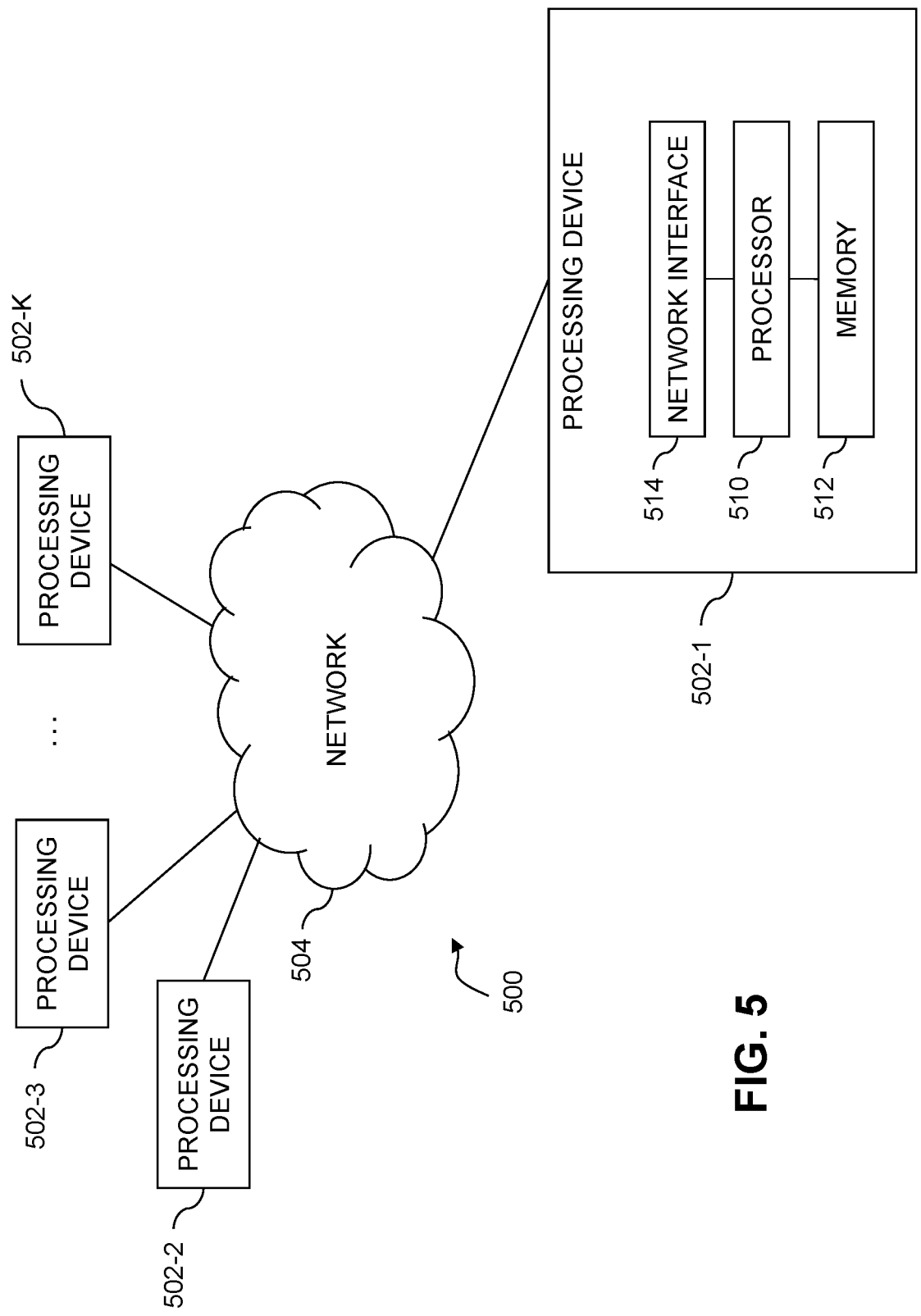

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide automated zoning set selection functionality in a distributed storage system of the type described above using one or more processes running on a given one of the VMs. For example, each of the VMs can implement logic instances and/or other components for implementing functionality associated with automated zoning set selection in the system 100.

A hypervisor platform may be used to implement a hypervisor within the virtualization infrastructure 404. Such a hypervisor platform may comprise an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can also provide automated zoning set selection functionality in a distributed storage system of the type described above. For example, a container host device supporting multiple containers of one or more container sets can implement logic instances and/or other components for implementing automated zoning set selection functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the automated zoning set selection functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, data protection appliances, automated zoning set selection logic instances and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
    to receive at least one notification from a switch of a switch fabric coupled between one or more host devices and a storage system, the notification being received in at least one of (i) a given one of the one or more host devices and (ii) a data protection appliance coupled to the switch, the notification being a particular type of notification for which the given host device and/or the data protection appliance has previously registered with the switch in order to automatically receive multiple separate and distinct instances of notifications of that particular type from the switch over time;
    to select, in the at least one of the given host device and the data protection appliance, a particular one of a plurality of zoning sets based at least in part on the one or more received notifications; and
    to send an indication of the selected zoning set from the at least one of the given host device and the data protection appliance to the switch;
    wherein selecting a particular one of a plurality of zoning sets based at least in part on the one or more received notifications comprises:
    selecting a first one of the plurality of zoning sets responsive to the one or more received notifications indicating a first type of performance issue; and
    selecting a second one of the plurality of zoning sets different than the first zoning set responsive to the one or more received notifications indicating a second type of performance issue different than the first type of performance issue.

2. The apparatus of claim 1 wherein the at least one processing device comprises the data protection appliance.

3. The apparatus of claim 1 wherein the at least one processing device comprises the given host devices.

4. The apparatus of claim 1 wherein the switch comprises a Fibre Channel (FC) switch of an FC switch fabric.

5. The apparatus of claim 1 wherein the notification comprises a fabric performance impact notification (FPIN) generated by the switch.

6. The apparatus of claim 1 wherein the indication of the selected zoning set is configured to cause the switch to alter its zoning configuration.

7. The apparatus of claim 1 wherein sending an indication of the selected zoning set to the switch comprises:
    generating at least one command that includes information characterizing the selected zoning set; and
    sending the command to the switch.

8. The apparatus of claim 7 wherein the command is configured to instruct the switch to alter its zoning configuration in accordance with the information characterizing the selected zoning set.

9. The apparatus of claim 1 wherein a given one of the plurality of zoning sets comprises zoning configuration information for each of one or more zones configured utilizing the switch fabric.

10. The apparatus of claim 9 wherein the zoning configuration information for a particular one of the zones comprises:
    an identifier of a particular port of one of the one or more host devices; and
    an identifier of a particular port of the storage system.

11. The apparatus of claim 1 wherein the switch is configured to implement an arbitration mechanism to resolve command conflicts in situations in which the switch receives multiple commands from respective different processing devices each instructing a zoning configuration change for the switch.

12. An apparatus comprising:
    at least one processing device comprising a processor coupled to a memory;

the at least one processing device being configured:
to receive at least one notification from a switch of a switch fabric coupled between one or more host devices and a storage system, the notification being received in at least one of (i) a given one of the one or more host devices and (ii) a data protection appliance coupled to the switch, the notification being a particular type of notification for which the given host device and/or the data protection appliance has previously registered with the switch in order to automatically receive multiple separate and distinct instances of notifications of that particular type from the switch over time;
to select, in the at least one of the given host device and the data protection appliance, a particular one of a plurality of zoning sets based at least in part on the one or more received notifications; and
to send an indication of the selected zoning set from the at least one of the given host device and the data protection appliance to the switch;
wherein the at least one processing device is further configured to perform at least one filtering operation on the one or more received notifications to determine whether or not a zoning configuration change is appropriate before performing at least one of the selecting of the particular zoning set and the sending of the indication of the selected zoning set to the switch; and
wherein the filtering operation implements a hysteresis effect by limiting a number of zoning configuration changes that can be made within a specified time period.

13. A computer program product comprising a non-transitory processor-readable storage medium having stored therein program code of one or more software programs, wherein the program code when executed by at least one processing device comprising a processor coupled to a memory, causes the at least one processing device:
to receive at least one notification from a switch of a switch fabric coupled between one or more host devices and a storage system, the notification being received in at least one of (i) a given one of the one or more host devices and (ii) a data protection appliance coupled to the switch, the notification being a particular type of notification for which the given host device and/or the data protection appliance has previously registered with the switch in order to automatically receive multiple separate and distinct instances of notifications of that particular type from the switch over time;
to select, in the at least one of the given host device and the data protection appliance, a particular one of a plurality of zoning sets based at least in part on the one or more received notifications; and
to send an indication of the selected zoning set from the at least one of the given host device and the data protection appliance to the switch;
wherein selecting a particular one of a plurality of zoning sets based at least in part on the one or more received notifications comprises:
selecting a first one of the plurality of zoning sets responsive to the one or more received notifications indicating a first type of performance issue; and
selecting a second one of the plurality of zoning sets different than the first zoning set responsive to the one or more received notifications indicating a second type of performance issue different than the first type of performance issue.

14. The computer program product of claim 13 wherein sending an indication of the selected zoning set to the switch comprises:
generating at least one command that includes information characterizing the selected zoning set; and
sending the command to the switch;
wherein the command is configured to instruct the switch to alter its zoning configuration in accordance with the information characterizing the selected zoning set.

15. The computer program product of claim 13 wherein the program code when executed by the at least one processing device further causes the at least one processing device to perform at least one filtering operation on the one or more received notifications to determine whether or not a zoning configuration change is appropriate before performing at least one of the selecting of the particular zoning set and the sending of the indication of the selected zoning set to the switch.

16. The computer program product of claim 15 wherein the filtering operation implements a hysteresis effect by limiting a number of zoning configuration changes that can be made within a specified time period.

17. A method comprising:
receiving at least one notification from a switch of a switch fabric coupled between one or more host devices and a storage system, the notification being received in at least one of (i) a given one of the one or more host devices and (ii) a data protection appliance coupled to the switch, the notification being a particular type of notification for which the given host device and/or the data protection appliance has previously registered with the switch in order to automatically receive multiple separate and distinct instances of notifications of that particular type from the switch over time;
selecting, in the at least one of the given host device and the data protection appliance, a particular one of a plurality of zoning sets based at least in part on the one or more received notifications; and
sending an indication of the selected zoning set from the at least one of the given host device and the data protection appliance to the switch;
wherein selecting a particular one of a plurality of zoning sets based at least in part on the one or more received notifications comprises:
selecting a first one of the plurality of zoning sets responsive to the one or more received notifications indicating a first type of performance issue; and
selecting a second one of the plurality of zoning sets different than the first zoning set responsive to the one or more received notifications indicating a second type of performance issue different than the first type of performance issue; and
wherein the method is performed by at least one processing device comprising a processor coupled to a memory.

18. The method of claim 17 wherein sending an indication of the selected zoning set to the switch comprises:
generating at least one command that includes information characterizing the selected zoning set; and
sending the command to the switch;
wherein the command is configured to instruct the switch to alter its zoning configuration in accordance with the information characterizing the selected zoning set.

19. The method of claim 17 wherein at least one filtering operation is performed on the one or more received notifications to determine whether or not a zoning configuration change is appropriate before performing at least one of the selecting of the particular zoning set and the sending of the indication of the selected zoning set to the switch.

20. The method of claim 19 wherein the filtering operation implements a hysteresis effect by limiting a number of zoning configuration changes that can be made within a specified time period.

\* \* \* \* \*